United States Patent
Aslanian et al.

(10) Patent No.: US 11,021,948 B2
(45) Date of Patent: Jun. 1, 2021

(54) METHOD FOR THE HYDRODYNAMIC CHARACTERIZATION OF MULTI-RESERVOIR WELLS

(71) Applicant: Limited Liability Company "SONOGRAM", Moscow (RU)

(72) Inventors: Artur Mikhailovich Aslanian, Kazan (RU); Dmitry Aleksandrovich Davydov, Kazan (RU); Irina Yurievna Aslanian, Kazan (RU); Yulliya Sergeevna Maslennikova, Kazan (RU); Dmitry Sergeevich Voloskov, Kazan (RU)

(73) Assignee: TGT Oilfield Services Limited, Road Town (VG)

( * ) Notice: Subject to any disclaimer, the term of this patent is extended or adjusted under 35 U.S.C. 154(b) by 55 days.

(21) Appl. No.: 16/476,765

(22) PCT Filed: Sep. 6, 2017

(86) PCT No.: PCT/RU2017/050085
§ 371 (c)(1),
(2) Date: Jul. 9, 2019

(87) PCT Pub. No.: WO2018/132037
PCT Pub. Date: Jul. 19, 2018

(65) Prior Publication Data
US 2019/0360324 A1    Nov. 28, 2019

(30) Foreign Application Priority Data
Jan. 11, 2017  (EA) .................................. 201700023

(51) Int. Cl.
*E21B 47/06*   (2012.01)
*G01H 3/00*    (2006.01)

(52) U.S. Cl.
CPC ............... *E21B 47/06* (2013.01); *G01H 3/00* (2013.01)

(58) Field of Classification Search
CPC ....................................................... E21B 47/06
See application file for complete search history.

(56) References Cited

U.S. PATENT DOCUMENTS 3,321,965 A * 5/1967 Johnson ................... E21B 47/06
                                                    73/152.37
5,887,657 A * 3/1999 Bussear ................. E21B 17/028
                                                    166/316

(Continued)

FOREIGN PATENT DOCUMENTS

EA          201400080        6/2015
GB          2504918 B        11/2015

(Continued)

*Primary Examiner* — Steven A MacDonald
(74) *Attorney, Agent, or Firm* — Boyle Fredrickson S.C.

(57) ABSTRACT

The preferred embodiments are directed to the oil-producing industry and can be used in operating multi-reservoir wells. A method for the determination of hydrodynamic parameters for each flowing reservoir that includes reaching at least one well operating mode with fluid flow through both the wellbore and one or more reservoirs, measuring at least one parameter that characterises fluid flow, recording its acoustic noise logging data, calculating noise power using reservoir fluid flow noise logging data, and subsequent multi-phase hydrodynamic modelling to determine hydrodynamic parameters for each identified reservoir.

2 Claims, 6 Drawing Sheets

(56) References Cited

U.S. PATENT DOCUMENTS

| | | |
|---|---|---|
| 9,163,499 B2 | 10/2015 | Adams et al. |
| 2005/0171699 A1* | 8/2005 | Zazovsky ............. E21B 49/008 702/11 |
| 2008/0230221 A1* | 9/2008 | Zafari .................. E21B 49/087 166/254.1 |
| 2009/0276156 A1 | 11/2009 | Kragas et al. |
| 2016/0273336 A1* | 9/2016 | Quintero ................ G01V 5/101 |
| 2016/0356125 A1 | 12/2016 | Bello et al. |

FOREIGN PATENT DOCUMENTS

| | | | |
|---|---|---|---|
| RU | 2108460 C1 | 4/1998 | |
| RU | 2167289 | 5/2001 | |
| RU | 2465454 C1 | 10/2012 | |
| WO | WO 2015/099580 A1 * | 7/2015 | ............. E21B 47/06 |

* cited by examiner

METHOD FOR THE HYDRODYNAMIC CHARACTERIZATION OF MULTI-RESERVOIR WELLS

TECHNICAL FIELD

This invention relates to the oil-producing industry and can be used in multi-reservoir wells.

BACKGROUND ART

The patent RU 2167289 (IPC U211 47/06, published on 20 May 2000, Samara State Architectural and Construction Academy) describes a method for the determination of formation pressure in an oil well. The technical result consists in reduced idle time for wells under survey and increased accuracy and reliability of formation pressure measurements. Bottom-hole pressure $p_b$ is measured by a downhole pressure gauge. The well is shut-in 2-3 min later and bottom-hole pressure is measured again in $t_k$=10-15 min to take this point as the origin of coordinates for a section of a pressure build-up curve with a bottom-hole pressure increase of $\Delta p_n$ after well shut-in. Then, the bottom-hole pressure increase $\Delta p$ is measured every 8-10 min for 100 min. The current formation pressure increase is calculated by a reduced formula using the least square method. The resulting value is used to calculate the ultimate formation pressure increase, time constants and coefficients by comparing, at a certain time instant, the calculated pressures and the actual ones of the initial portion of the pressure build-up curve. The pressure build-up curve is extrapolated up to the instant when the formation pressure increase over a preset period of time becomes zero. The resulting values are used to calculate formation pressure.

The drawback of the method is its inapplicability to multi-reservoir wells or in the absence of reliable well flow-rate data.

The patent RU 2465454 (IPC E21B 47/06, published on 27 Oct. 2012, Gazprom Dobycha Nadym LLC) describes a method for formation pressure evaluation while developing multi-reservoir gas and gas-condensate fields that includes running at least one variable-diameter pipe string equipped with one or more packers to separate reservoirs. The pressure in each reservoir is evaluated by successive penetration of reservoirs, with one being penetrated and others isolated from the pipe string. The well is cased with telescoping casing in which every next production casing has a smaller diameter than the preceding one. Completion tubing is run into the well concentrically, one pipe inside the other, in an amount depending on the number of producing formations penetrated and with the diameter decreasing from the upper reservoir to the lower one. The static formation pressure is measured in each reservoir at the wellhead of a well with tubing, tubing heads and pressure measuring devices for each reservoir. The technical result consists in the increased efficiency of formation pressure measurements in a multi-reservoir field and in reduced capital and operating expenses on well construction for each target zone. The drawbacks of the method are the complexity of measurements and, therefore, their high cost.

The patent RU 2108460 (IPC E21B 47/06, published on 10 Apr. 1998, Irkenneft Oil and Gas Production Department, Tatneft JSC) describes a method for determining formation pressure in an oil deposit in which well shut-in is followed by a period of time for pressure equalisation between the near-wellbore region and the reservoir, a well pressure measurement, calculation of formation pressure expected at a certain point of the reservoir depending on other wells' interference, and the use of the resulting value to adjust well operation until reaching the calculated pressure at that point. The period of pressure equalisation between the near-wellbore region and the reservoir is determined by the formula $T=A/I_p$, where T—the period of pressure equalisation between the near-wellbore region and the reservoir (days); A—volumetric elastic capacity coefficient of the producing reservoir (m$^3$/MPa); $I_p$—Reduced production index (m$^3$/d·MPa) The volumetric elastic capacity coefficient of the producing reservoir is determined by a mathematical formula.

The main drawback of this method, as well as that of all pressure build-up and level recovery methods, is the requirement to shut-in a well for the survey period.

The application US 20090276156 A1 (IPC E21B 43/12, published on 5 Nov. 2009, BP EXPLORATION OPERATING, GB etc.) proposes a method for determining formation pressure. The drawbacks of this method are the requirement to have permanently active pressure gauges in a survey well and its inapplicability to a multi-reservoir system.

The U.S. Pat. No. 9,163,499 B2 (IPC E21B 47/06, https://www.google.ru/patents/U.S. Pat. No. 9,163,499, published on 20 Oct. 2015, BP CORPORATION NORTH AMERICA INC.) proposes a method for determining formation pressure.

The drawbacks of this method are the uncertainty in input parameters and its inapplicability to a multi-reservoir system.

The method for the evaluation of formation pressure in the near-wellbore zone of a multi-reservoir well based on two noise measurements in different well operating modes (Application EA201400080 (A1), published on 30 Jun. 2015, IPC E21B 47/06, TGT Prime LLC) is closest to the proposed method. This method includes reaching at least one well operating mode with fluid flow through both the wellbore and one or more reservoirs, measuring at least one parameter that characterises fluid flow, recording its acoustic noise logging data, changing the well operating mode, recording acoustic noise logging data related to the change in fluid flow rate, and processing of all parameter measurement data and flow-related acoustic noise data to determine the formation pressure for each identified reservoir. Data processing results in formation pressure evaluations for the near-wellbore zone of each individual flowing reservoir.

This method is based only on analysis of Spectral Noise Logging (SNL) and bottom-hole pressure data. The SNL tool records acoustic noises generated by a flowing reservoir only in the near-wellbore zone, i.e. within 3-5 m from the wellbore. Therefore, the resulting formation pressure values are valid only for the near-wellbore zone. However, oilfield applications require information on formation pressure at the external boundary, which may be at a distance of about 100 m from the wellbore. Therefore, the main drawbacks of this method are the impossibility to evaluate formation pressure at the external boundary or to acquire information on such reservoir characteristics as the skin factor and piezoconductivity ratio for each producing reservoir unit.

The proposed method of formation pressure evaluation using noise logging data in combination with hydrodynamic modelling is free of the above drawbacks and limitations.

DISCLOSURE OF INVENTION

The object of the invention and the technical result to be achieved through its use are the development of a new method for determining hydrodynamic reservoir parameters in multi-reservoir wells and increasing the reliability of formation pressure measurements at the external boundary along with expansion of its application scope.

This objective and the technical result of the use of the invention are achieved by determining hydrodynamic reservoir parameters, such as formation pressure at the external boundary, piezoconductivity ratio and skin factor for each producing reservoir through the analysis of acquired acoustic noise logging data and multi-phase hydrodynamic modelling, by additional measurements performed in unperforated intervals or open holes and by measuring reservoir noise and wellbore pressure in one or more well operating modes. This proposed new method for the determination of hydrodynamic parameters for each flowing reservoir includes reaching at least one well operating mode with fluid flow through both the wellbore and one or more reservoirs; measuring at least one parameter that characterises fluid flow and recording acoustic noise generated by reservoir fluid flow; noise power calculation using reservoir fluid flow noise logging data and subsequent multi-phase hydrodynamic modelling to determine hydrodynamic parameters for each identified reservoir. Fluid flow is characterised by measuring at least one parameter—wellbore pressure. Using more than one operating mode under given recommendations increases the accuracy of results.

Recommendation 1: Bottom-hole pressure is changed so, preferably by not less than 30 percent of that in the previous mode, as to maintain subsequent required operating modes.

Recommendation 2: Volumetric flow rate is changed so, preferably by not less than 30 percent of that in the previous (first) mode, as to maintain a required operating mode.

Recommendation 3: The durations of well operation in each mode and noise measurements are calculated taking into account the average reservoir parameters and geometry of a formation, and measurements are performed using a device for the objective measurement of sound level during downward and/or upward movement of this device in the well at a constant speed and/or at stations, with the measurement of wellbore pressure using a high-sensitivity pressure sensor at a constant speed or at stations, while establishing a well operating mode by setting flow rate and/or bottom-hole pressure, with subsequent analysis of at least one determined parameter to evaluate formation pressure in the near-wellbore zone and average acoustic noise power within each flowing reservoir and then use the resulting noise powers and wellbore pressures to calculate formation pressure in the near-wellbore zone for each flowing reservoir by multi-phase hydrodynamic modelling.

A distinctive feature of the invention is the use of noise logging data acquired in one or more well operating modes, which enables the determination of hydrodynamic reservoir parameters at the external boundary, in unperforated intervals directly communicating with perforated intervals and in open holes, thus increasing the reliability of formation pressure measurements at the external boundary and of hydrodynamic reservoir parameters for both production and injection wells and for each flowing reservoir to achieve the technical result consisting in increased reliability of measurements along with expansion of its application scope.

The second distinctive feature of the invention is the availability of a multi-phase hydrodynamic simulator enabling the determination of formation pressure and reservoir properties (skin factor and piezoconductivity ratio at the external boundary) for both injection and production wells with any fluid compositions and without having to shut in a well.

A prime example of the expanded application of the invention is the evaluation of formation pressure at the external boundary (at a distance of about 100 m from the wellbore). Because of the limited radius of investigation of the Spectral Noise Logging tool (3-5 m of the reservoir from the wellbore), the reservoir noise power determined by noise logging contains information only on formation pressure in the near-wellbore zone. The main distinctive feature of the proposed method for the determination of hydrodynamic reservoir parameters consists in a hydrodynamic modelling stage to evaluate formation pressure and other reservoir parameters at the external boundary of the well. This substantially expands the application scope of the method because the reservoir parameters at the external boundary are used to optimise oil and gas field development. Another application is the evaluation of such reservoir characteristics as permeability and skin factor. These characteristics are extremely important for the evaluation of remaining hydrocarbon reserves and for planning the development of an entire field throughout its life including late stages. However, direct methods for the determination of these characteristics, such as that including core retrieval during drilling and laboratory analyses, are costly. Therefore, additional information about hydrodynamic reservoir parameters acquired by the proposed method substantially expands its application scope.

Figure 1:
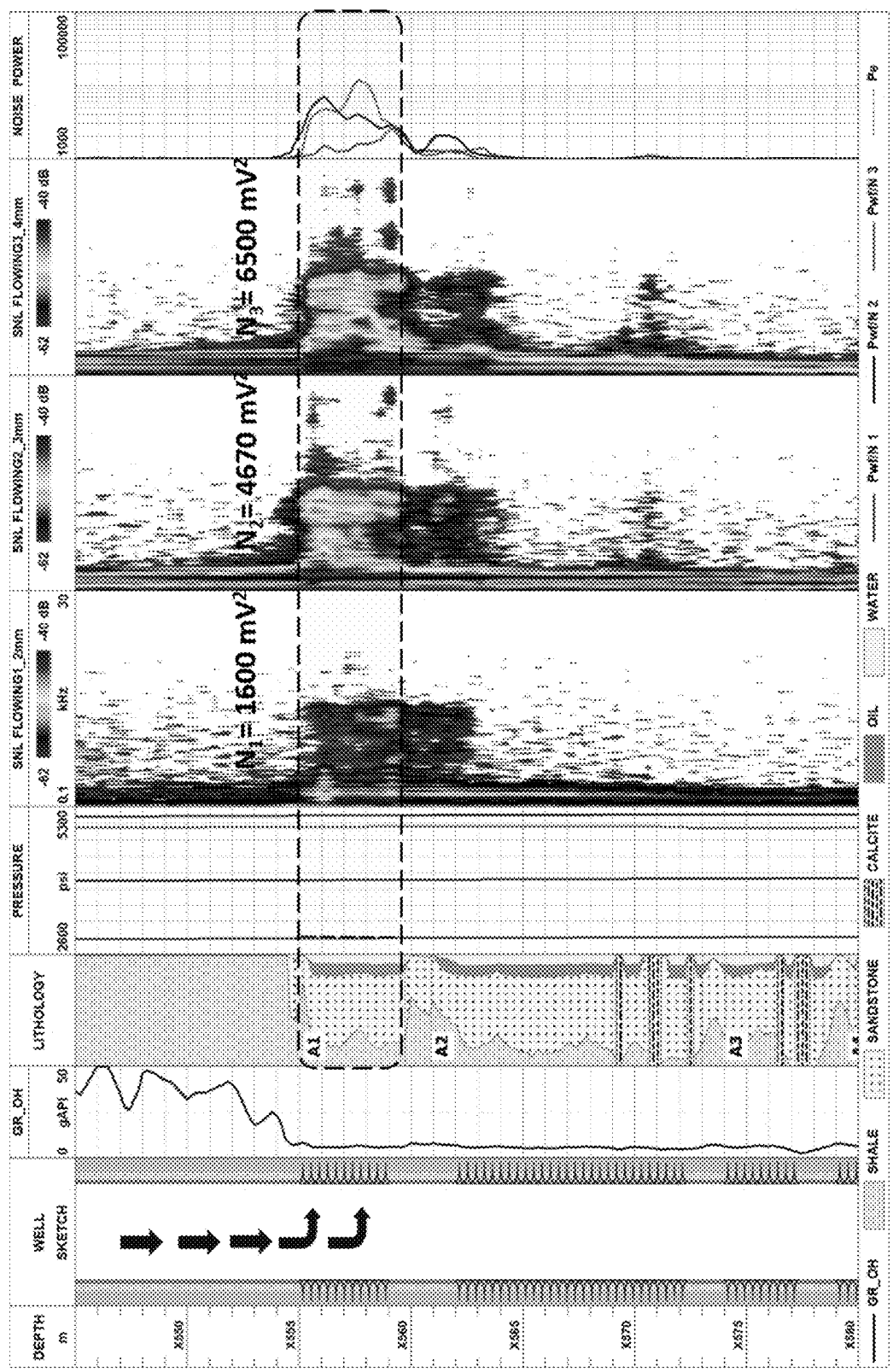
FIG. 1 shows noise logging data acquired from an injection well in three operating modes. Shown left to right are depth in metres (DEPTH), well design (WELL SKETCH), gamma-ray log (GR_OH), lithology (LITHOLOGY), bottom-hole pressure (PRESSURE), three spectral noise logging data panels for three flow rates (SNL FLOWING1_2 mm, SNL FLOWING2_3 mm and SNL FLOWING3_4 mm) and reservoir noise power (NOISE POWER) calculated for noise frequencies above 5 kHz, i.e. wellbore flow frequencies.

The top part of the figure shows the pressure ($P_{wf}$) and noise power (N) histories during operating mode stabilisation, and the bottom part shows the reservoir flow rate history.

BEST MODE FOR CARRYING OUT THE INVENTION

This proposed new method for the determination of hydrodynamic parameters for each flowing reservoir of a multi-reservoir well includes reaching at least one well operating mode with fluid flow through both the wellbore and one or more producing reservoirs, bottom-hole pressure and reservoir noise power measurements in an operating well in one or more operating modes, and subsequent processing of acquired measurement data. The distinctive feature of the proposed method is that acoustic noise power and pressure across the flowing reservoir interval characterise reservoir flow.

An important parameter is the duration of well operation in one operating mode required before the well reaches a new operating mode. This duration depends on the petrophysical characteristics of the reservoir. The higher the reservoir piezoconductivity, the faster the well reaches a new operating mode. This duration can be estimated more accurately only by pressure transient analyses (pressure build-up and fall-off tests).

A device for the objective measurement of sound levels at various frequencies (noise logging tool) performs measurements while travelling down and/or up the well. Measurements can be performed both at stations and during downward or upward passes. Stationary measurements are preferable because noises caused by tool motion are naturally excluded.

Stationary measurements can be more than 10 seconds long. The recommended distance between stations is 1 m, but this distance can be shorter or longer depending on the total survey duration. It should be noted that several sound level measuring devices can be used in a survey, with proportionally longer distances between stations (for instance, up to 3 m for three simultaneously used devices).

Logging speed should be limited—for instance, to 2 m/min—when measurements are made at a constant speed. Rubber centralisers can be used to reduce acoustic noise caused by the friction of the tool housing against the wellbore wall.

Raw data recorded by the device for the objective measurement of sound level should be processed to calculate the power of acoustic noise generated by flowing reservoirs. One of the following techniques should be used for this purpose.

If measurements are made in the time domain, further calculations require the total noise power to be obtained as the sum of the squares of the amplitudes in the raw data recorded during the survey.

If data are recorded continuously with a constant sampling frequency, the complete continuous record should be divided into time intervals—for instance, into intervals containing 1024 points for ease of further calculations. Then, acoustic power should be determined for each of these records.

If measurements are made at stations, the noise power measured during a stationary period should be averaged. Averaging can be performed using a known statistical estimation technique (arithmetic mean, median averaging, mode, etc). Such data processing produces a set of average noise power values for each station. Then, the average noise power is determined for each flowing reservoir interval.

Flowing reservoir intervals can be identified using, for instance, a downhole noise power curve by locating the most significant maxima and intervals of the curve in which noise power values are above the background. The background value of the curve is the noise power in an interval above a perforated zone with no permeable zones, i.e. where noise comes only from wellbore flow. After the identification of flowing reservoir intervals, the average noise power is determined for each of them. Averaging can be performed using a known statistical estimation technique (arithmetic mean, median averaging, mode, etc). The previously obtained background noise power values are deducted from the resulting averaged noise power values. This procedure should be carried out for each well operating mode.

Flowing reservoir zones can also be identified through visual or automated analysis of Spectral Noise Logging data panels. For this purpose, raw data recorded by the device for the objective measurement of sound level are analysed using a spectral analysis method—for instance, the Fourier transform. The obtained acoustic noise spectra, or spectral noise-power densities, are visualised as colour spectral noise data panels, with depth as the vertical axis, frequency as the horizontal axis and the spectrum amplitude shown in colour. If measurements are made at a constant speed, each spectrum is visualised. If measurements are stationary, the noise spectral density should be averaged for each station and each harmonic using a known statistical estimation technique (arithmetic mean, median averaging, mode, etc).

The identification of active reservoir intervals using spectral data panel requires selecting depth intervals in which the noise spectral density amplitude is higher than the background noise level. The background noise level is the amplitude of noise evenly distributed in the spectral data panels and within unperforated casing intervals with no high-frequency noise (for instance, above 5 kHz).

Reservoir flow noise should also be selectively identified against the background of casing fluid flow noise. This noise has significant depth extent (for instance, more than 30 m) and falls on low frequencies (for instance, below 1-5 kHz).

Local noises associated with reservoir flow can be identified by a filtering method—for instance, that based on wavelet thresholding or median trend deduction. In such cases, a colour spectral data panel does not contain background noise or casing fluid flow noise.

Another method that can be used is the automated identification of flowing reservoir zones based on the analysis of spatial and frequency features contained in the colour spectral data panel.

The spectral data panel can also be used to calculate the average reservoir noise power by calculating the sum of the squares of spectral noise density amplitudes for the entire interval and dividing the result by the value of the frequency interval used for summing. Different devices for the measurement of sound levels may have different frequency ranges. The resulting noise-power depth curve is processed using one of the aforementioned methods. The advantage of using spectral data panels to assess noise power is that the latter can be calculated only for the range of reservoir flow frequencies and not for the entire frequency range, thus eliminating the influence of wellbore fluid flow frequencies.

Further calculations are based on the assumption that the noise power N in the flowing reservoir interval is proportional to the pressure gradient and flow rate, depending on time and distance from the wellbore:

$$\frac{dN(t, r)}{dV} = -Au(t, r)\nabla P(t, r) \quad \text{(Equation 1)}$$

The proportionality factor A in Equation (1) is constant for one device and one reservoir with constant fluid composition, which has been confirmed by numerous laboratory studies and well surveys.

Equation (1) is semi-empirical. A similar dependence is given in [McKinley, R. M, 1994, Temperature, Radioactive Tracer, and Noise Logging for Well Integrity: 112-156] as $N = K \cdot Q \cdot (P - P_{n\pi})$, where Q is the volumetric flow rate, and K is the proportionality factor.

Darcy's equation relates the reservoir fluid flow rate to the applied pressure gradient:

$$u(t, r) = -\frac{k}{\mu}\nabla P \quad \text{(Equation 2)}$$

The noise recorded by the device, taking into account the noise attenuation factor β, is determined as $$N(t) = 4\pi A(k/\mu)\int_{r_w}^{r_e} (\nabla P)^2 \exp(-\beta r) r^2 dr \quad \text{(Equation 3)}$$

The wellbore pressure at the reservoir depth in the n-th operating mode can be described as $$P_n(t) = P_{n\pi} - (Q_n - Q_{n-1})\sum_{i=1}^{n} P_u(t_n - t_m^0, \theta) \quad \text{(Equation 4)}$$

where $p_u(t,\theta)$ is an analytical solution of the linear equation for low-compressible fluid $$\frac{1}{r}\frac{\partial\left(r\frac{\partial p}{\partial r}\right)}{\partial r} = \frac{1}{\chi}\frac{\partial p}{\partial t},$$

which is a piezoconductivity equation with χ being a piezoconductivity ratio, relative to the wellbore pressure of a well put on stream at the unit production rate, $Q_n$ is the production rate in the n-th mode, $t_n$—measurement time, $t_{n0}$—time of switching over into the n-th mode, and θ—reservoir parameter vector accounting for the skin factor and reservoir piezoconductivity. The function $p_u(t,\theta)$ depends on the selected reservoir model. Assuming that $\tilde{N} = a \cdot Q \cdot (P - P_{n\pi})$, where $\tilde{N}$ is processed tool data and a is the proportionality factor constant for a specific tool and a specific reservoir, Equation (4) can be re-written as $$P_n = P_{n\pi} - \left(\frac{\tilde{N}_n}{a \cdot (P_{n\pi} - P_n)} - \frac{\tilde{N}_{n-1}}{a \cdot (P_{n\pi} - P_{n-1})}\right) \cdot \sum_{i=1}^{n} p_u(t_n - t_{n0}, \theta)$$

Thus, a system of n non-linear equations, one for each mode, can be written as (Equation 5)

$$\begin{cases} P_1 = P_{n\pi} - \left(\frac{\tilde{N}_1}{a \cdot (P_{n\pi} - P_1)}\right) \cdot \sum_{i=1}^{n} p_u(t_1 - t_1^0, \theta) \\ \ldots \\ P_n = P_{n\pi} - \left(\frac{\tilde{N}_n}{a \cdot (P_{n\pi} - P_n)} - \frac{\tilde{N}_{n-1}}{a \cdot (P_{n\pi} - P_{n-1})}\right) \cdot \sum_{i=1}^{n} p_u(t_n - t_n^0, \theta) \end{cases}$$

This system can be numerically solved for $P_{fm}$, a and θ by minimising the sum of the square differences between the right and left sides of the equations using numerical optimisation algorithms.

Numerical studies showed that $P_{fm}$ can be determined with sufficient accuracy using wellbore noise and pressure measurement data from an operating well for the infinite homogeneous reservoir model $$p_u = \frac{B}{4\pi\sigma}\left(E_i\left(-\frac{r^2}{4\chi}\right) + 2S\right),$$

where B is the formation volume factor, σ—reservoir hydraulic conductivity, χ—piezoconductivity ratio.

$$E_i(x) = \int_x^{\infty} \frac{e^{-u}}{u} du -$$

—exponential integral function, and S—skin factor. The resulting parameter estimates are $P_{fm}$, a and $\chi e^{2s}$. Measurements in more than three operating modes increase the reliability of the estimates. Other reservoir models can also be used. In such cases, measurements in more than three operating modes or additional a priori information about the reservoir may be required for accurate estimates.

Spectral noise logging data are processed to estimate the reservoir noise power. This is implemented by calculating the spectral noise power. Threshold filtering algorithms are used to select the spectral reservoir noise components for which the total noise power is calculated. Then, the noise power is averaged depthwise for a reservoir interval with uniform flow.

The proposed method includes the following stages.

Initially, reservoir noise is measured (Regime 1). Regime 1 may correspond to the current operating mode of the well defined by the current flow rate, bottom-hole pressure and choke size.

Then, the wellbore pressure is measured (Regime 1) using a high-sensitivity pressure sensor at a constant speed or at stations during downward or upward tool movement in the wellbore.

If necessary, reservoir noise can be measured for the second and third time, when the second regime implies up to two-fold variation in bottom-hole pressure, preferably by not less than 30%, or changing volumetric flow rate, also preferably by not less than 30%. This example of bottom-hole pressure and volumetric flow rate variations by not less than 30% is only an illustration of some aspects of the invention and does not limit its scope in any way. Therefore, it should be understood that this variation may be less than 30% if this is sufficient for establishing the second well operating regime according to the invention and does not impair the accuracy of measurements. After that, the wellbore pressure is measured.

Then, noise power profiles are determined using raw noise data recorded in the time domain or by processing spectral noise density data and are averaged taking into account background noise within flowing reservoir intervals, which is followed by calculation of the hydrodynamic parameters of all flowing reservoirs (formation pressure at the external boundary of wells, piezoconductivity ratio and skin factor) using Equation (5).

Given below are examples of using the proposed method as illustrations of some aspects of implementation of the invention, which in no way limits its scope.

Figure 2:
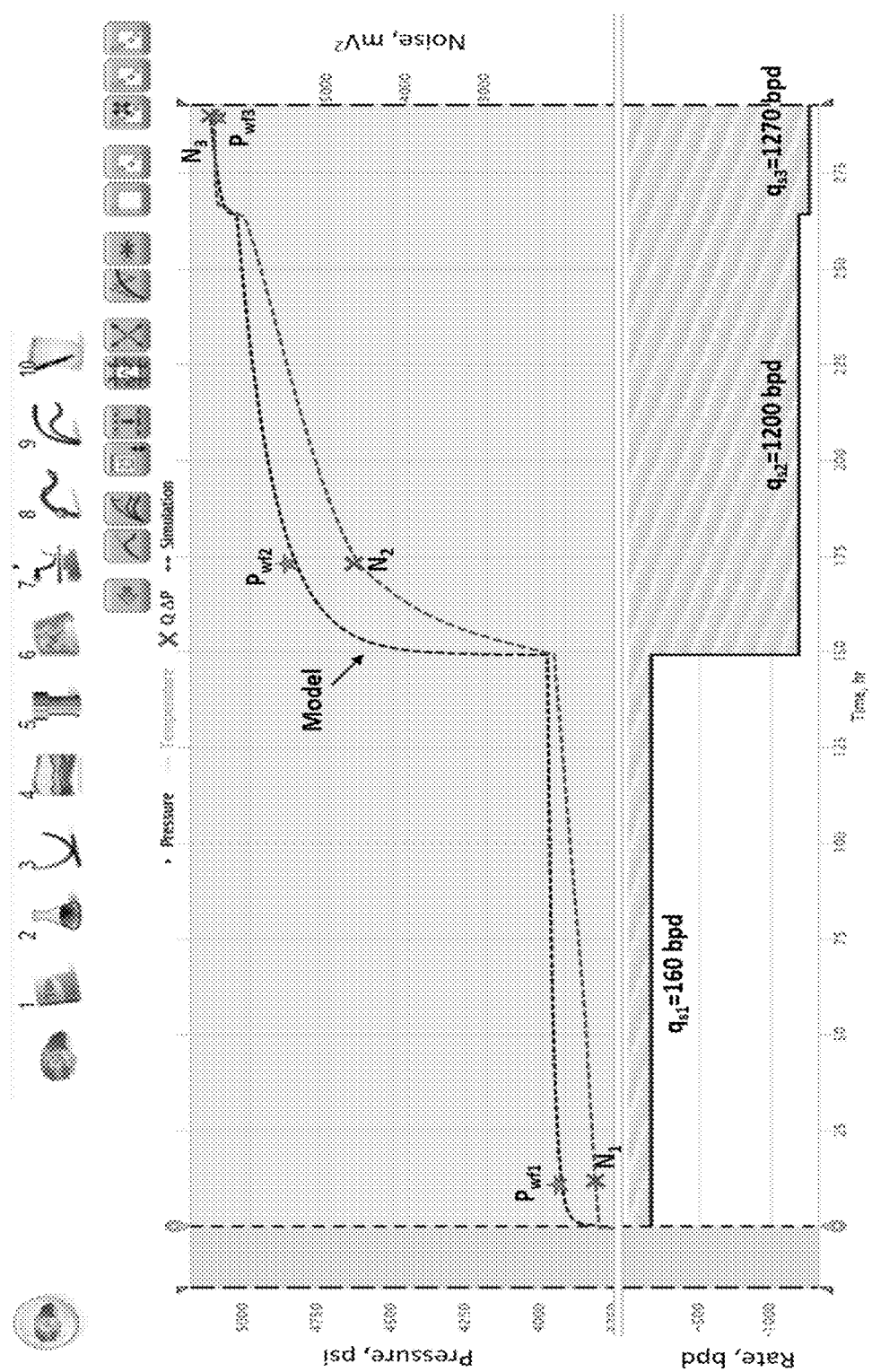
FIG. 2 shows modelling results for an injection well obtained using the PolyGon™ software. The top part of the figure shows the pressure ($P_{wf}$) and noise power (N) histories during the changes and stabilisation of three operating modes, and the bottom part shows the reservoir flow rate history.

Example 1. Determination of Formation Pressure at the External Boundary of a Multi-Reservoir Injection Well This example features a West Siberian field with its reservoirs contained in highly stratified sandstone. The survey under study was conducted in an injection well. The first technological stage consisted in Triple-rate Spectral Noise Logging (TSNL) conducted at three flow rates representing three well operating modes. The second stage consisted in the interpretation of noise logging data. One flowing interval was identified (FIG. 1). The noise powers determined for three well operating modes were respectively 1600 mV$^2$, 4670 mV$^2$ and 6500 mV$^2$. In the final stage, the formation pressure (2980 psi) and skin factor (−2) were calculated by the PolyGon™ software system using wellbore pressures on the top of the flowing reservoir (3980 psi, 4940 psi and 5150 psi) and measurement time as input parameters (FIG. 2).

Figure 3:
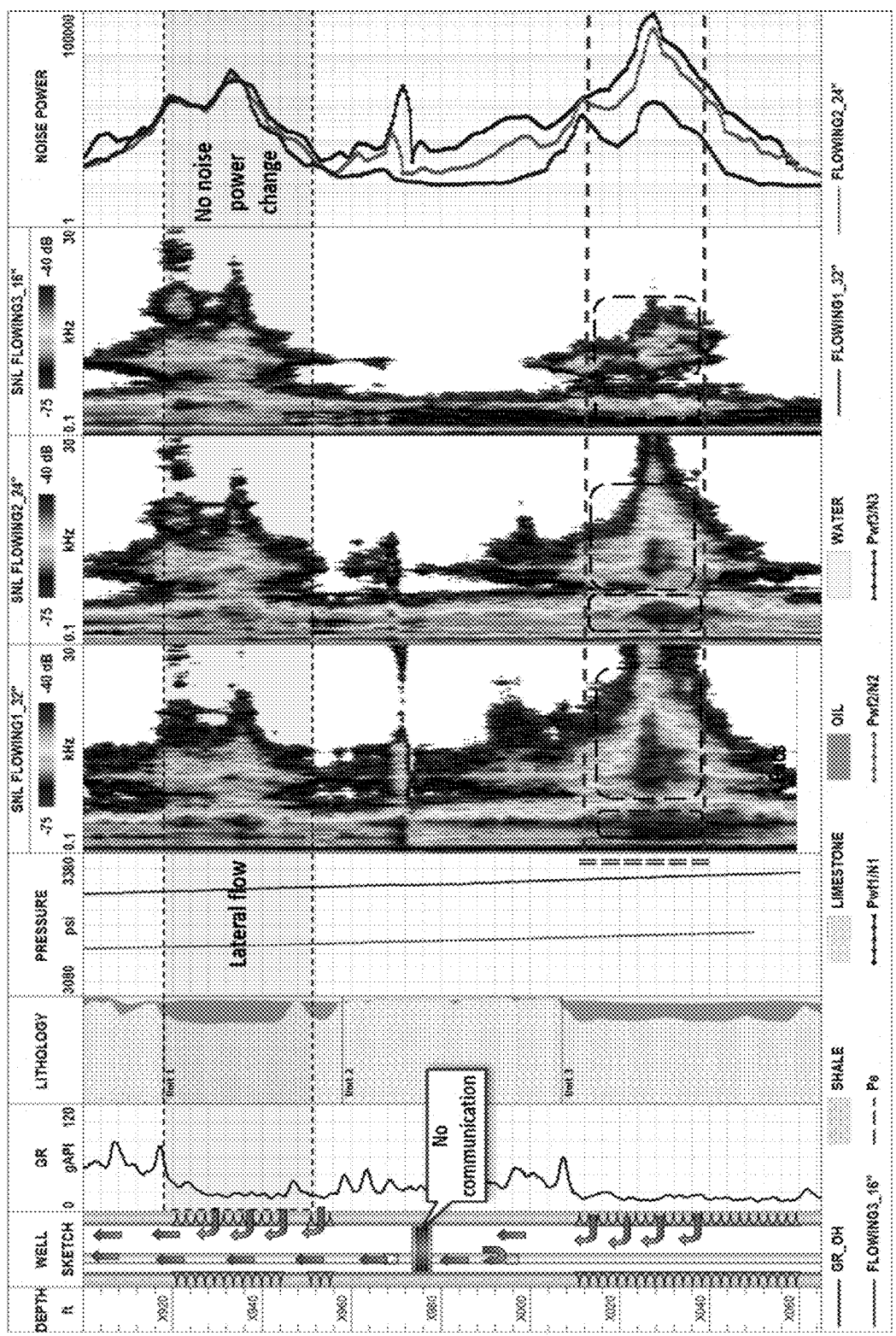
FIG. 3 shows noise logging data acquired in three operating modes of a production well. Shown left to right are depth in metres (DEPTH), well design (WELL SKETCH), gamma-ray log (GR_OH), lithology (LITHOLOGY), bottom-hole pressure (PRESSURE), three spectral noise logging data panels for three flow rates (SNL FLOWING1_32", SNL FLOWING1_24" and SNL FLOWING1_16") and reservoir noise power (NOISE POWER) calculated for noise frequencies above 10 kHz, i.e. pipe string flow frequencies.
Figure 4:
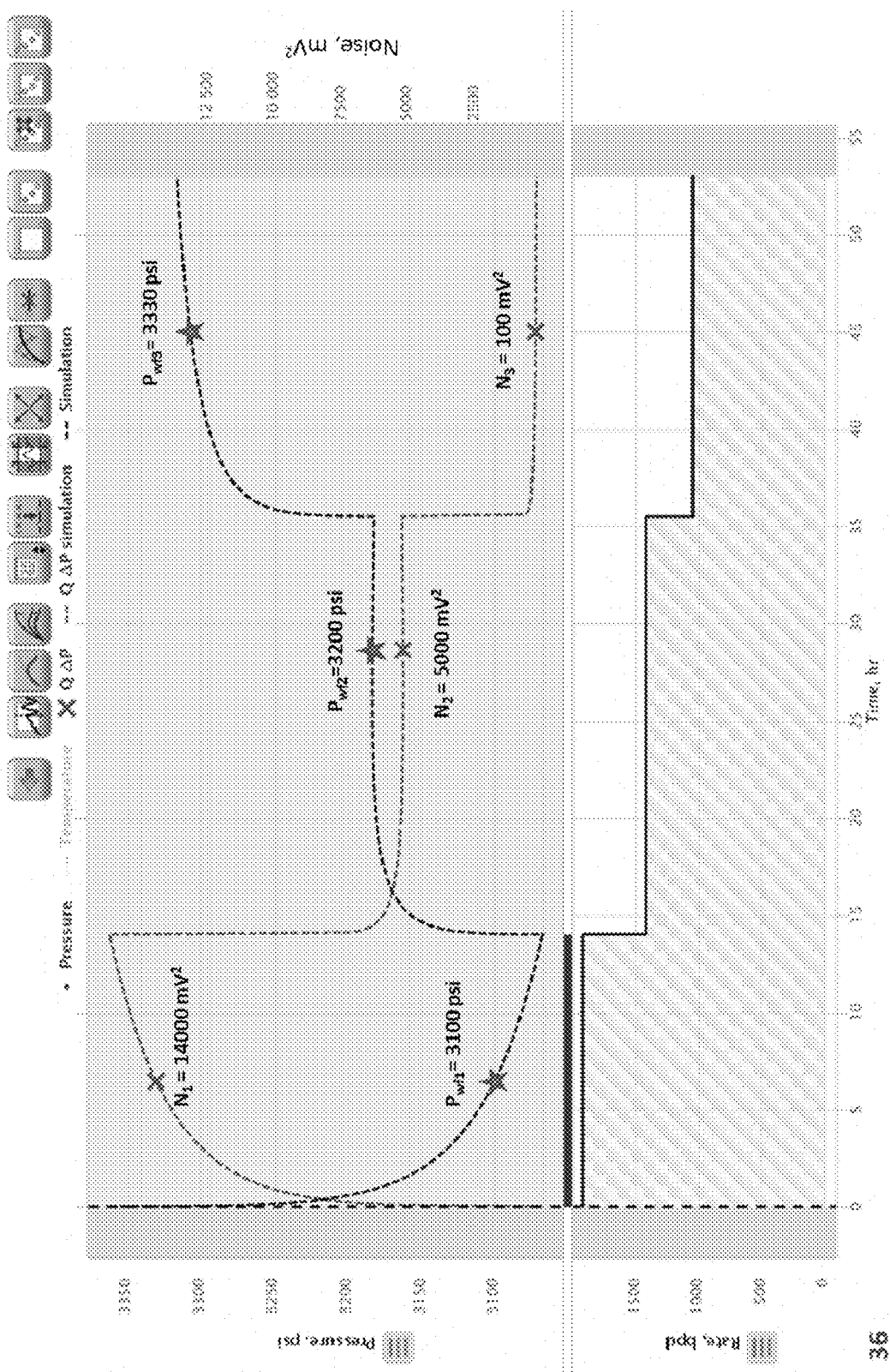
FIG. 4 shows modelling results for a production well obtained using the PolyGon™ software. The top part of the figure shows the pressure ($P_{wf}$) and noise power (N) histories during the changes and stabilisation of three operating modes, and the bottom part shows the reservoir flow rate history.

Example 2. Determination of Formation Pressure at the External Boundary of a Multi-Reservoir Production Well This example features an Arabian Gulf field with carbonate reservoirs. The survey under study was conducted in a production well and consisted in TSNL performed according to the procedure described in Example 1. Then, noise logging data were interpreted. Two flowing intervals were identified (FIG. 3). The formation pressure could not be determined because of no noise power variation in the upper reservoir. The noise powers determined for the lower reservoir were respectively 14,000 mV$^2$, 5000 mV$^2$ and 100 mV$^2$. The formation pressure (3360 psi) and skin factor (−1) were calculated by the PolyGon™ software system using wellbore pressures on the top of the flowing reservoir (3100 psi, 3200 psi and 3330 psi) and measurement time (FIG. 4).

Figure 5:
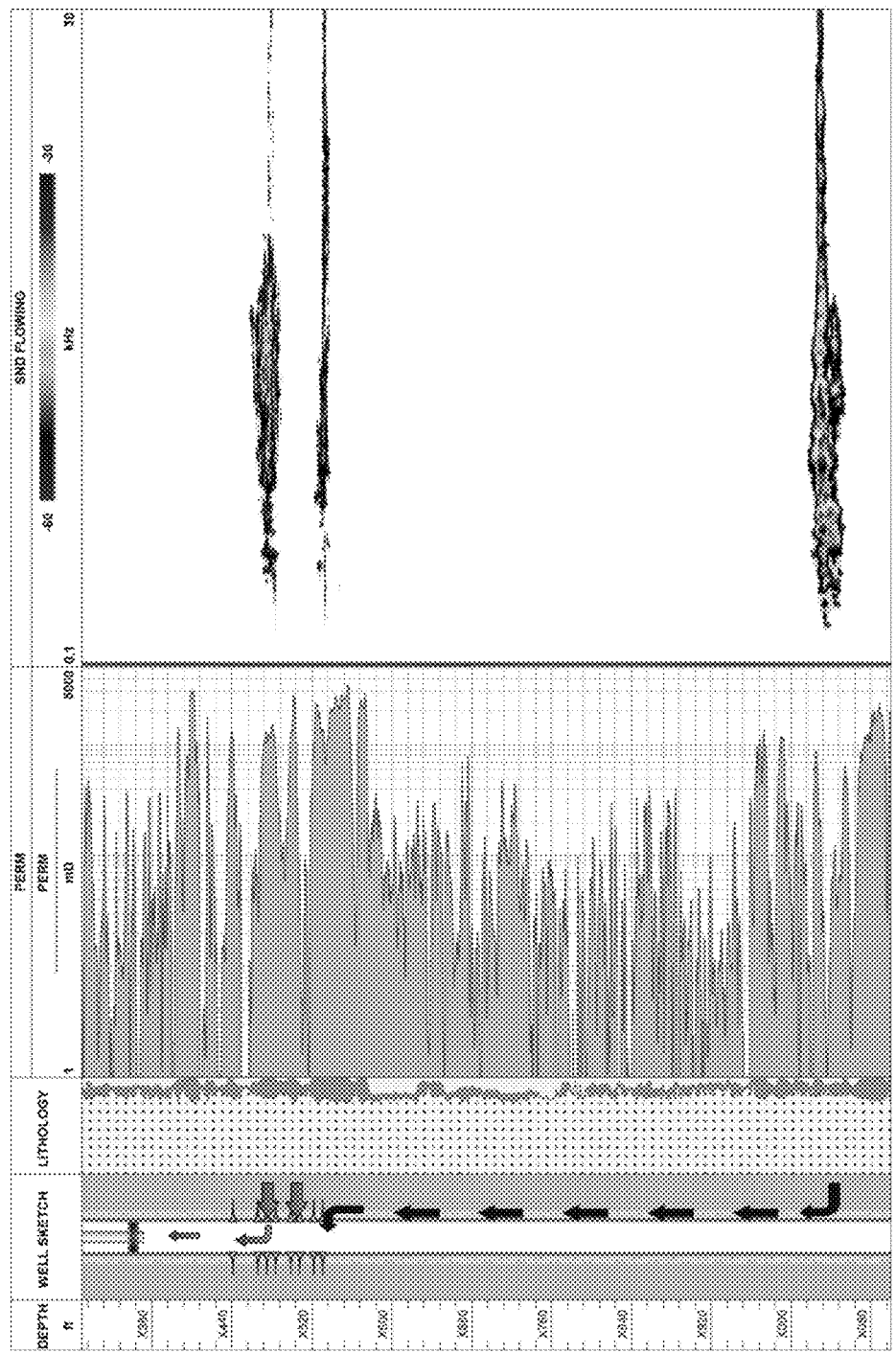
FIG. 5 shows noise logging data acquired from a production well in one operating mode. Shown left to right are depth (DEPTH), well design (WELL SKETCH), lithology (LITHOLOGY), permeability (PERM) and noise logging data.

Example 3. Determination of Formation Pressure at the External Boundary of a Multi-Reservoir Production Well in One Operating Mode (FIG. 5)

Figure 6:
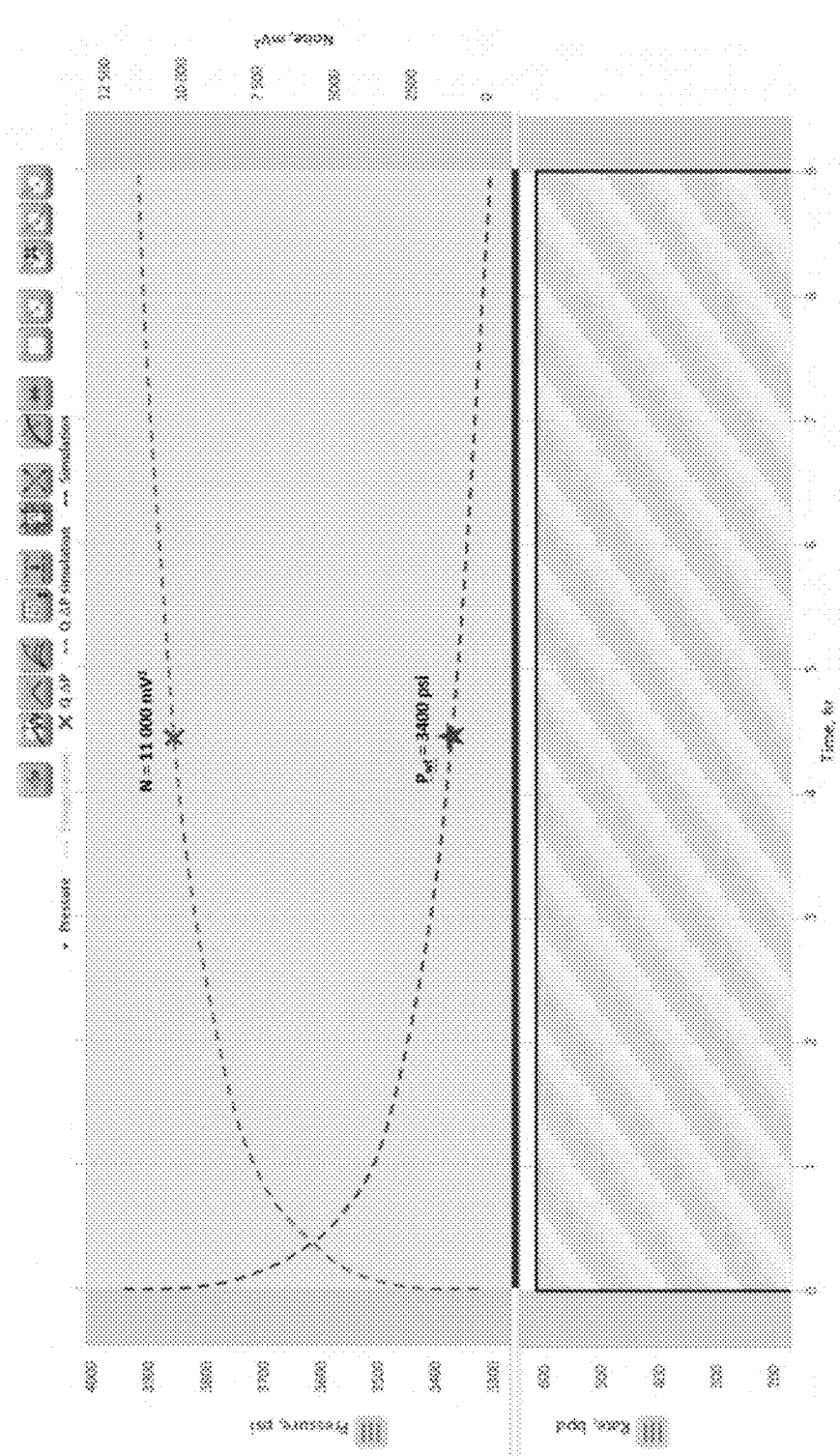
FIG. 6 shows modelling results for a production well in one operating mode obtained using the PolyGon™ software.

This example demonstrates the application of the method using SNL in one well operating mode. The example features production through the casing annulus where the flow rate cannot be measured by a conventional flow meter. The PolyGon™ software system estimated the formation pressure at the external boundary of a flowing reservoir at 3960 psi using SNL data, the conversion factor for recalculating noise power into flow rate through the N~k*Q$^2$ function (in which the coefficient k is determined in the laboratory), skin factor and permeability (FIG. 6).

While this application describes specific aspects of the invention, it allows numerous modifications and variations, which will be evident to experts in this technical field after studying the disclosure of the invention including the use of functional and/or structural equivalents of the components described in this document. For instance, it will be evident to an expert in this technical field that the invention must not be limited to its implementation using any specific sensor or tool, i.e. that conventional hydrophones and pressure gauges can be used as the instruments of this invention. All such variations that are evident to experts in this technical field are considered to be within the scope of this invention described in the attached patent claims. For a clear definition, it should be noted that "characterised in" implies "including but not limited to".

The invention claimed is:

1. A method for the determination of hydrodynamic parameters for each flowing reservoir in a wellbore through multiple reservoirs, including:

reaching at least one well operating mode with fluid flow through both the wellbore and one or more reservoirs;

measuring at least one parameter that characterises fluid flow and recording acoustic noise generated by fluid flow in the one or more reservoirs;

performing a noise power calculation using the recorded acoustic noise data for the one or more reservoirs and subsequently performing multi-phase hydrodynamic modelling to determine hydrodynamic parameters for each of the one or more reservoirs to determine the reservoir pressure and the piezoconductivity coefficient on the supply loop and the skin factor separately for each identified reservoir, calculated using the equation:

$$\begin{cases} P_1 = P_{n\pi} - \left(\frac{\tilde{N}_1}{a \cdot (P_{n\pi} - P_1)}\right) \cdot \sum_{i=1}^{n} p_u(t_1 - t_1^0, \theta) \\ \quad \quad \cdots \\ P_n = P_{n\pi} - \left(\frac{\tilde{N}_1}{a \cdot (P_{n\pi} - P_1)} - \frac{\tilde{N}_{n-1}}{a \cdot (P_{n\pi} - P_{n-1})}\right) \cdot \sum_{i=1}^{n} p_u(t_n - t_n^0, \theta) \end{cases}$$

where $P_{n\pi}$ is the reservoir pressure;

$\tilde{N}_1, \tilde{N}_1, \ldots \tilde{N}_n$ is the formation noise power calculated from the acoustic noise logging data;

θ is the vector of reservoir parameters (including piezoconductivity coefficient and skin factor);

$t_n$ is the measurement time at the n-th operation modes of the well;

$t_n^0$ is the time of switching to the n-th well operation mode;

a is the proportionality coefficient constant for a specific tool and a specific formation;

$P_1, P_2 \ldots P_n$ is the pressure in the wellbore opposite the identified formation at the 1st, 2nd and nth well operation modes, respectively;

$p_u(t_n-t_n^0, \theta)$ is one of the analytical solutions of the piezoconductivity equation.

2. A method according to claim 1 in which fluid flow is characterised by measuring at least wellbore pressure.

* * * * *